C. KELLER.
Improvement in Saw-Sets.

No. 129,892.  Patented July 30, 1872.

Witnesses. Alx. Selkirk, Chas. J. Selkirk

Conrad Keller, Inventor.

UNITED STATES PATENT OFFICE.

CONRAD KELLER, OF SCHENECTADY, NEW YORK.

IMPROVEMENT IN SAW-SETS.

Specification forming part of Letters Patent No. 129,892, dated July 30, 1872.

*To all whom it may concern:*

Be it known that I, CONRAD KELLER, of Schenectady, county of Schenectady, State of New York, have invented certain new and useful Improvements in Saw-Sets; and I do hereby declare that the following is a description thereof, reference being had to the accompanying drawing forming a part of this specification, in which—

Figure 1:
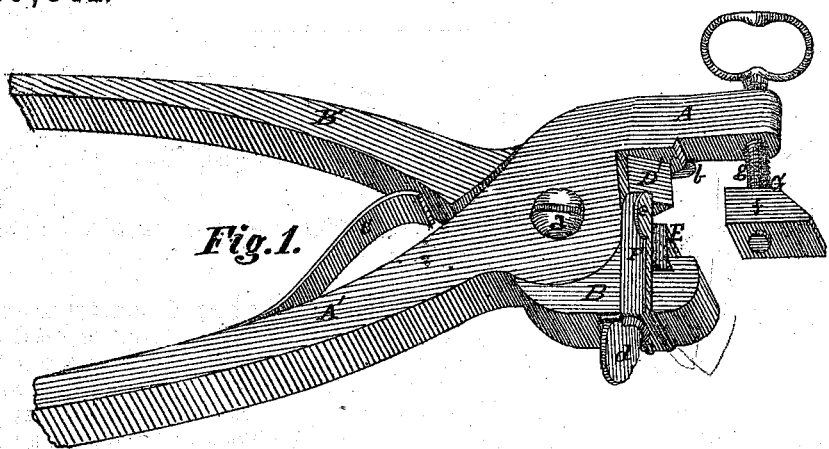
Figure 2:
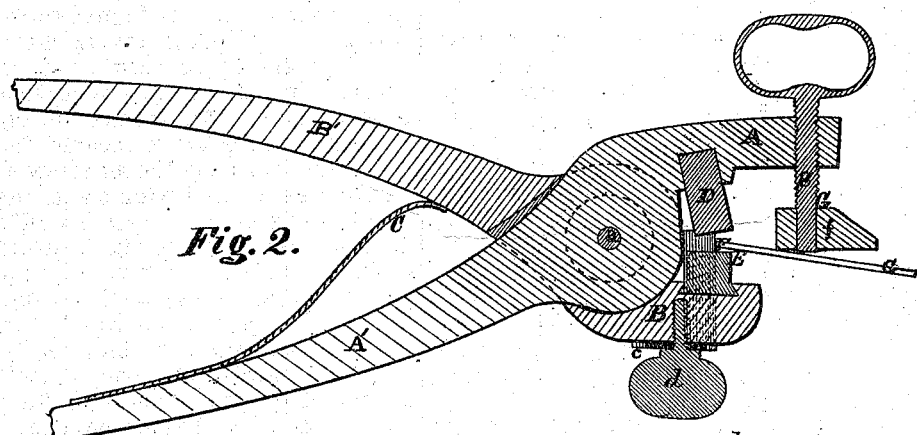
Figure 3:
Figure 4:
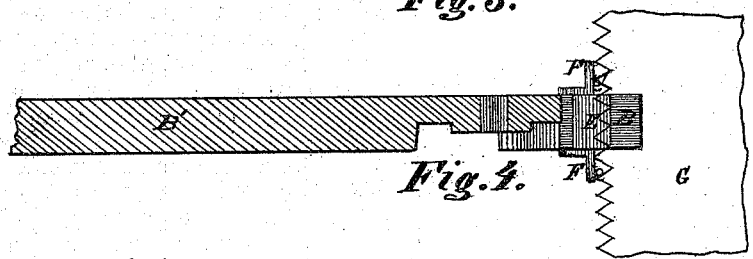

Figure 1 is a perspective view of the saw-set, illustrating the improvements in this invention. Fig. 2 is a longitudinal sectional view of the same. Fig. 3 is a vertical view of the lower jaw, viewed on its inner face side. Fig. 4 is a vertical view of the upper jaw, viewed from its inner face side.

My invention relates to certain improvements in saw-sets; and consists in arranging with one of the jaws of the set a changeable triangular oblong piece, which will present several triangular set-faces, any of which may be used to act on the teeth of the saw; also, in combination with the said changeable triangular piece and its jaws, a gage with the anvil-piece, and an adjustable stop, so constructed and arranged that the body of the saw will be prevented from throwing up when the set is brought down on the tooth; the object of this invention being to render the tool capable of adjustment to the length of the teeth to be set, and render the operation of setting the teeth precise.

To enable others skilled in the art to make and use my invention, I will proceed to describe it in reference to the drawing and the letters of reference marked thereon, the same letters indicating like parts.

In the drawing, A represents a jaw of the tool. A' is its handle. B is the second jaw, provided with the handle B'. C is the usual spring, used to throw the jaws A and B apart. *a* is the pivot on which the said parts move. In the jaw A, close to the body surrounding the pivot *a*, is made a triangular recess, having its base-line next to the said body, into which recess I place the tooth-set D, Figs. 1, 2, and 3, which tooth-set is made to consist of an oblong piece of hardened steel, made with a triangular cross-structure, as shown in Figs. 2 and 3. The said tooth-set is secured in the said recess by the set-screw *b*, and can be removed and so changed that any one of the angles on its ends can be used when required, thus giving to the tool six set angles or corners with which to operate with the teeth of the saw, so that in case any of the said set-corners break the remaining ones can be used. E is the usual anvil-piece, on which the tooth of the saw is to rest when it is to receive its set, which anvil-piece is preferably secured to the jaw B by dovetailing, as shown in Fig. 2. F is a tooth-gage, consisting of a metal piece formed similar to a clip, having a slotted wing, *c*, on its lower side, as shown in Figs. 1 and 2, by which the gage is secured to the jaw B from the outside by the set-screw *d*; by means of the said slotted wing *c* and the set-screw *d* the said gage can be readily adjusted longitudinally on its jaw in either direction, to line with the face of the anvil E, to suit any required length of saw-teeth to be set. Each side of the gage is provided with a face, *e*, Figs. 1 and 4, against which the points of the teeth are intended to touch when they are to be operated upon, as shown in Fig. 4. Working into the jaw A is an adjustable screw, *g*, carrying the metal block *f*, which is pivoted thereto, as shown, which screw and block constitute the stop G, which may be so operated as to be adjusted to a greater or less distance from the inner face of the said jaw A, to bring the lower surface of the piece *f* on any desired plane above the upper surface of the anvil E, and be capable of contacting with the body of the saw to hold it down when the set is forced down on the tooth resting on the anvil. By operating the said screw *g* the stop can be made to permit a greater or less set to the saw, according to the relative adjustment of the face of the piece *f* with the face of the anvil.

In operating with the saw-set above described, the tooth-gage F is to be set to correspond to the length of the teeth of the saw to be operated upon; and the stop G is to be adjusted to suit the inclination desired to be given to the teeth, when the tool is to be placed to the saw in such a manner as to bring the tooth on the anvil, with the points of the adjacent teeth against the gage F, when the handles are to be pressed together to cast the tooth-set D down on the tooth beneath, which operation will be attended by the casting down of the stop G to contact with the body of the saw.

The improvements in this invention, though simple, will enable a person not an expert to properly set the teeth of a saw in a rapid manner.

Having described my invention, what I claim, and desire to secure by Letters Patent, is—

1. Forming the tooth-set D oblong, with a triangular form of cross-structure, and capable of being variously inserted in the jaw A, substantially as and for the purpose set forth.

2. In a saw-set provided with the oblong and triangular form of tooth-set above set forth, and in combination with the same, the adjustable gage F, constructed and arranged as described, and the stop G capable of relative adjustment with the face of the anvil E, when the several parts are constructed and arranged to operate substantially as specified, for the purposes set forth.

CONRAD KELLER.

Witnesses:
 ALEX. SELKIRK,
 CHAS. J. SELKIRK.